United States Patent
Noponen et al.

(10) Patent No.: US 10,056,624 B2
(45) Date of Patent: Aug. 21, 2018

(54) SEALING ARRANGEMENT OF SOLID OXIDE CELL STACKS

(71) Applicant: ELCOGEN OY, Vantaa (FI)

(72) Inventors: Matti Noponen, Espoo (FI); Pauli Torri, Helsinki (FI)

(73) Assignee: ELCOGEN OY, Vantaa (FI)

( * ) Notice: Subject to any disclaimer, the term of this patent is extended or adjusted under 35 U.S.C. 154(b) by 0 days.

(21) Appl. No.: 15/407,882

(22) Filed: Jan. 17, 2017

(65) Prior Publication Data

US 2017/0125826 A1 May 4, 2017

Related U.S. Application Data

(63) Continuation of application No. PCT/FI2014/050583, filed on Jul. 17, 2014.

(51) Int. Cl.
*H01M 8/24* (2016.01)
*H01M 8/0273* (2016.01)
(Continued)

(52) U.S. Cl.
CPC ............ *H01M 8/0273* (2013.01); *C25B 1/00* (2013.01); *C25B 1/10* (2013.01); *C25B 9/08* (2013.01); *C25B 9/206* (2013.01); *C25B 15/08* (2013.01); *H01M 8/0258* (2013.01); *H01M 8/0276* (2013.01); *H01M 8/0282* (2013.01); *H01M 8/0286* (2013.01); *H01M 8/1231* (2016.02);
(Continued)

(58) Field of Classification Search
CPC ............ H01M 8/2425; H01M 8/0282; H01M 8/0273; H01M 8/0276; H01M 8/0286; H01M 8/1231; H01M 8/0258; H01M 8/2457; H01M 2008/1293; C25B 1/00; C25B 1/10; C25B 9/08; C25B 9/206; C25B 15/08
USPC ......................................................... 429/457
See application file for complete search history.

(56) References Cited

U.S. PATENT DOCUMENTS

| 2006/0134502 | A1 | 6/2006 | Garceau | |
|---|---|---|---|---|
| 2006/0166053 | A1* | 7/2006 | Badding | ............. H01M 8/0271 429/429 |
| 2012/0107714 | A1* | 5/2012 | Day | ................... H01M 8/0273 429/457 |

FOREIGN PATENT DOCUMENTS

| DE | 196 40 805 C1 | 6/1998 |
|---|---|---|
| DE | 10 2005 005117 A1 | 8/2006 |
| EP | 2 104 171 A1 | 9/2009 |
| EP | 2 224 526 A1 | 9/2010 |
| JP | 2013 004271 A | 1/2013 |

OTHER PUBLICATIONS

International Search Report (PCT/ISA/210) dated Mar. 27, 2015, by the European Patent Office as the International Searching Authority for International Application No. PCT/FI2014/050583.
(Continued)

*Primary Examiner* — Gary Harris
(74) *Attorney, Agent, or Firm* — Buchanan Ingersoll & Rooney PC

(57) ABSTRACT

A sealing arrangement of solid oxide cell stacks is disclosed. The sealing arrangement includes a gasket structure between a flow field plate and an electrolyte element, and between flow field plates of repetitious structures, with first sealing layers being in contact with the flow field plate and the gasket structure, the first sealing layers being overlaid over a selected area of the flow field plate and over a selected area of the gasket structure according to corrosion minimization criteria and on the basis of sealing function criteria.

12 Claims, 5 Drawing Sheets

(51) Int. Cl.
*H01M 8/0258* (2016.01)
*H01M 8/2457* (2016.01)
*H01M 8/2425* (2016.01)
*H01M 8/0282* (2016.01)
*H01M 8/0276* (2016.01)
*H01M 8/0286* (2016.01)
*C25B 1/00* (2006.01)
*C25B 1/10* (2006.01)
*C25B 9/08* (2006.01)
*C25B 9/20* (2006.01)
*H01M 8/1231* (2016.01)
*C25B 15/08* (2006.01)
*H01M 8/124* (2016.01)

(52) U.S. Cl.
CPC ....... *H01M 8/2425* (2013.01); *H01M 8/2457* (2016.02); *H01M 2008/1293* (2013.01); *Y02E 60/366* (2013.01)

(56) References Cited

OTHER PUBLICATIONS

International Preliminary Report on Patentability (PCT Article 36 and Rule 70) (PCT/IPEA/409) dated Mar. 27, 2015, by the European Patent Office as the International Searching Authority for International Application No. PCT/FI2014/050583.

\* cited by examiner

SEALING ARRANGEMENT OF SOLID OXIDE CELL STACKS

RELATED APPLICATION

This application claims priority as a continuation application under 35 U.S.C. § 120 to PCT/FI2014/050583 filed as an International Application on Jul. 17, 2014 designating the U.S., the entire content of which is hereby incorporated by reference in its entirety.

FIELD

Most of the energy of the world is produced by oil, coal, natural gas or nuclear power. All these production methods have characteristics as far as, for example, availability and friendliness to environment are concerned. As far as the environment is concerned, especially oil and coal cause pollution when they are combusted. With nuclear power, at least, storage of used fuel is of concern.

Especially because of the environmental concerns, new energy sources, more environmentally friendly and, for example, having a better efficiency than the above-mentioned energy sources, have been developed. Fuel cells, by which energy of fuel, for example biogas, is directly converted to electricity via a chemical reaction in an environmentally friendly process and electrolysers, in which electricity is converted to a fuel, are promising future energy solution devices.

Renewable energy production methods such as photovoltaic and wind power face challenges in seasonal production variations as their electricity production is limited by environmental effects. In the case of over production, hydrogen production through water electrolysis is suggested to be one of the future energy storing options. Furthermore, an electrolysis cell can also be utilized to produce high quality methane gas from renewably biogas stores.

The present disclosure is directed to a sealing arrangement in a Solid. Oxide Fuel Cell (SOFC) stack or in a Solid Oxide Electrolyzer Gell (SOEC) stack. A fuel cell causes input reactant fuel gas on an anode electrode and gaseous oxidizer (oxygen) on a cathode electrode to react in order to produce electricity. Electrolyzer reactions are reverse to fuel cell operation, i.e., electricity is used to produce fuel and oxygen. SOFC and SOEC stacks include stacked cell elements and separators in a sandwiched manner wherein each cell element is constituted by sandwiching an electrolyte, the anode side and the cathode side. The reactants are guided by flow field plates to porous electrodes.

BACKGROUND INFORMATION

A fuel cell, such as that presented in FIG. 1, includes an anode side 100 and a cathode side 102 and an electrolyte material 101 between them. Here the structure is called an electrolyte element 104 (FIGS. 2, 3, 4). In solid oxide fuel cells (SOFCs) oxygen 106 is fed to the cathode side 102 and it is reduced to a negative oxygen ion by receiving electrons from the cathode. The negative oxygen ion transfers through the electrolyte material 101 to the anode side 100 where it reacts with fuel 108 thereby producing electrons, water and also for example, carbon monoxide (CO) and carbon dioxide ($CO_2$). Anode 100 and cathode 102 are connected through an external electric circuit 111 having a load 110 for the fuel cell withdrawing electrical energy alongside heat out of the system. The fuel cell reactions in the case of methane, carbon monoxide and hydrogen fuel are shown below:

Anode: $CH_4 + H_2O = CO + 3H_2$ $CO + H_2O = CO_2 + H_2$ $H_2 + O^{2-} = H_2O + 2e^-$ Cathode: $O_2 + 4e^- = 2O^{2-}$ Net reactions: $CH_4 + 2O_2 = CO_2 + 2H_2O$ $CO + 1/2 O_2 = CO_2$ $H_2 + 1/2 O_2 = H_2O$ In an electrolysis operating mode (solid oxide electrolysis cells (SOEC) the reaction is reversed; i.e., heat, as well as electrical energy from a source 110, are supplied to the cell where water and often also carbon dioxide are reduced in the cathode side forming oxygen ions, which move through the electrolyte material to the anode side where oxidation reaction takes place. It is possible to use the same solid electrolyte cell in both SOC and SOEC modes. In such a case and in the context of this description the electrodes are for example, named anode and cathode based on the fuel cell operating mode, whereas in purely SOEC applications the oxygen electrode may be named the anode, and the reactant electrode as the cathode.

Solid oxide electrolyzer cells operate at temperatures which allow high temperature electrolysis reaction to take place, the temperatures being for example, between 500-1000° C., but temperatures differing from these limits may be useful. These operating temperatures are similar to those conditions of the SOFCs. The net cell reaction produces hydrogen and oxygen gases. The reactions for one mole of water are shown below, with reduction of water occurring at the anode:

Cathode: $H_2O + 2e^- \text{-} \text{-} \text{-} > 2 H_2 + O^{2-}$

Anode: $O^{2-} \text{-} \text{-} \text{-} > 1/2 O_2 + 2e^-$

Net Reaction: $H_2O \text{-} \text{-} \text{-} > H_2 + 1/2 O_2$.

In Solid Oxide Fuel Cell (SOFC) and Solid Oxide Electrolyzer (SOE) stacks, commonly here referred to as solid oxide cell stacks, where the flow direction of the cathode gas relative to the anode gas internally in each cell as well as the flow directions of the gases between adjacent cells, are combined through different cell layers of the stacks. Further, the cathode gas or the anode gas or both can pass through more than one cell before it is exhausted and a plurality of gas streams can be split or merged after passing a primary cell and before passing a secondary cell. These combinations serve to increase the current density and minimize the thermal gradients across the cells and the whole stack.

A SOFC delivers in normal operation a voltage of approximately 0.8V. To increase the total voltage output, the fuel cells can be assembled in stacks in which the fuel cells are electrically connected via flow field plates (also: separator plates, interconnect plates, interconnector plates, bipolar plates). The desired level of voltage determines the number of cells needed.

Bipolar plates separate the anode and cathode sides of adjacent cell units and at the same time enable electron conduction between anode and cathode. Interconnects, or bipolar plates can be provided with a plurality of channels for the passage of fuel gas on one side of an interconnect plate and oxygen rich gas on the other side. The flow direction of the fuel gas is defined as the substantial direction from the fuel inlet portion to the fuel outlet portion of a cell unit. Likewise, the flow direction of the oxygen rich gas is defined as the substantial direction from its inlet portion to its outlet portion of a cell unit.

Known cells are stacked one on top of each other with a complete overlap resulting in a stack with for instance co-flow having all fuel and oxidant inlets on one side of the stack and all fuel and oxidant outlets on the opposite side. One feature affecting the temperatures of the structure in operation is steam reformation of the fuel that is fed into the cell. Steam reformation is endothermic reaction and cools the fuel inlet edge of the cell.

Due to the exothermicity of the electrochemical process, the outlet gases leave at a higher temperature than the inlet temperature. When endothermic and exothermic reactions are combined in an SOFC stack a significant temperature gradient across the stack is generated. Large thermal gradients induce thermal stresses in the stack which are highly undesirable and they entail a difference in current density and electrical resistance. Therefore challenges of thermal management of an SOFC stack exist: to reduce thermal gradients enough to avoid unacceptable stresses and to maximize electric efficiency through homogenous current density profile.

Known fuel cell stacks or electrolyzes cell stacks have tolerance variations in electrolyte element structure thickness between the cell structures in the stacks. For example in a cell stack structure, in which ceramic materials are used, only thickness variations in the measure of only micrometers would be convenient in known embodiments. This results in differential flowing conditions between the cells causing varying cell voltage profile in the stack structure resulting in thermal gradients between the cells and decreased power density of the stack. Thus both the duty ratio of the stacks is decreased, and lifetime of the stacks is shortened, the first increasing the capital cost of the stack per produced electrical power output and the later increasing the operational cost of the stack structure as for example, the stack replacement time is shortened in a fuel cell system and cost of electricity is increased in the electrolyzer stack.

High temperature solid oxide cell stacks are alternate conversion technologies due to their extream high efficiencies both in fuel cell and electrolysis mode. The inherent challenge related to these technologies also stems from the high temperature, the challenge being corrosion of the materials causing increasing internal resistances to the structures decreasing the electricity production and hydrogen production capability of the fuel cell and the electrolyzer, respectively. Corrosion can exist in multiple places of the stack structure but are for example, emphasized in regions containing various material systems. Such a system is the triple phase area between metallic interconnect structure, sealing structure and oxidizing gas. In such a material system, for example, the metallic interconnect material, which is for example, made of ferritic stainless steel grades due to its good corrosion resistance and matching thermal expansion characteristics between other stack materials, can react with the sealing structure made for example, from at least partly glass material by for example, changing the crystal structure of the metal or by changing the protective oxide structure of the metal surface which eventually may lead to through plane oxidation of the steel material creating a direct path for fuel and oxygen to mix causing a catastrophic failure of the structure.

SUMMARY

A sealing arrangement is disclosed for a solid oxide cell stack, where each cell includes a fuel side, an oxygen rich side, and an electrolyte element having an electrolyte layer between the fuel side and the oxygen rich side, the cells being arranged to form a stack, and the solid oxide cell stack includes in repetitious structures a flow field plate for each cell to arrange flows in the cell, a flow distribution area on the flow field plate as an area to which fuel feed flow is guided, a flow outlet area on the flow field plate, a flow area on the flow field plate, and flow orifices open to the flow distribution area and to the flow outlet area, wherein the sealing arrangement comprises: at least one gasket structure, which is located between the flow field plate and the electrolyte element, and said at least one gasket structure is located between the flow field plates of said repetitious structures; first sealing layers, which are in contact with the flow field plate and the gasket structure, the first sealing layers being overlaid over a selected area of the flow field plate and over a selected area of the gasket structure; and second sealing layers in contact with the electrolyte element and the gasket structure, the second sealing layers being overlaid over a selected area of the electrolyte element and over a selected area of the gasket structure.

A sealing method is also disclosed for sealing solid oxide cell stacks, each cell having a fuel side, an oxygen rich side, and an electrolyte element having an electrolyte layer between the fuel side and the oxygen rich side, the cells being arranged to form a stack, which includes in repetitious structures a flow field plate for each cell to arrange flows in the cell, a flow distribution area on the flow field plate as an area to which fuel feed flow is guided, a flow outlet area on the flow field plate, a flow area on the flow field plate, and flow orifices opened to the flow distribution area and to the flow outlet area, wherein flows from the flow distribution area flow on a flow field plate, the method comprising: locating at least one gasket structure between the flow field plate and the electrolyte element, and between flow field plates of repetitious structures; locating first sealing layers in contact with the flow field plate and the gasket structure, the first sealing layers being overlaid over a selected area of the flow field plate and over a selected area of the gasket structure; and locating second sealing layers in contact with the electrolyte element and the gasket structure, the second sealing layers being overlaid over a selected area of the electrolyte element and over a selected area of the gasket structure.

DETAILED DESCRIPTION

Figure 1:
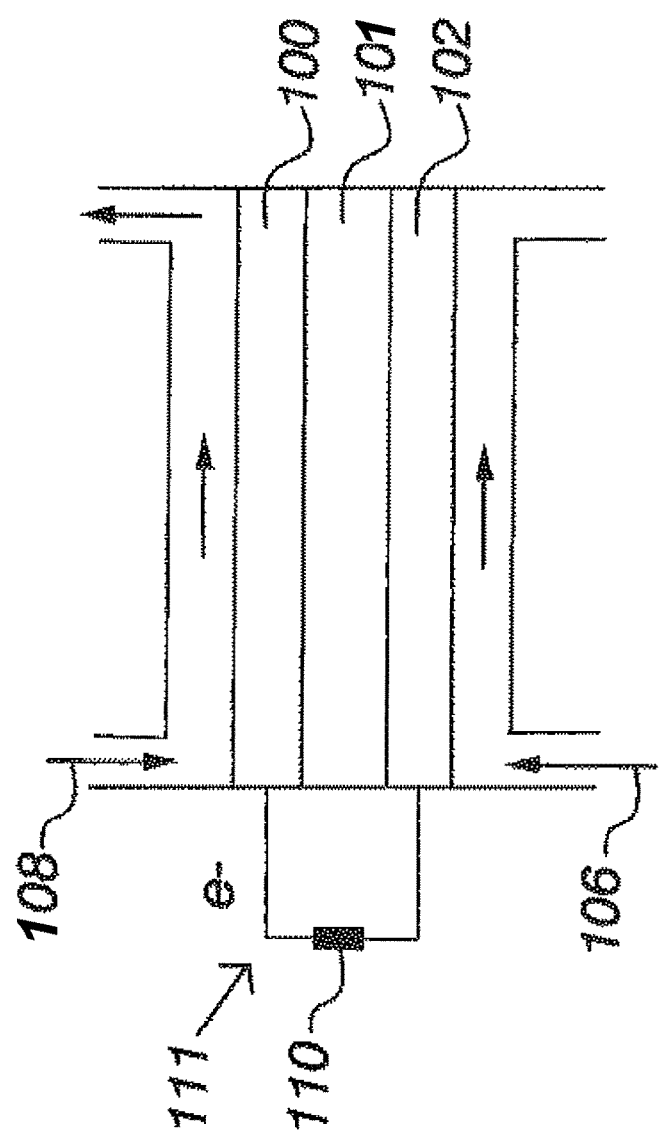
FIG. 1 presents a known single fuel cell structure.

Exemplary embodiments as disclosed herein can improve reliability and lifetime of a fuel cell or electrolyzer cell stack. This is achieved by a sealing arrangement of solid oxide cell stacks, each cell having a fuel side, an oxygen rich side, and an electrolyte element between the fuel side and the oxygen rich side, the cells being arranged to form of a stack, and the solid oxide cell stack includes in repetitious structures a flow field plate for each cell to arrange flows in the cell, a flow distribution area on the flow field plate, a flow outlet area on the flow field plate, a flow area on the flow field plate, and flow orifices opened to the flow distribution area and to the flow outlet area. The sealing arrangement can include at least one gasket structure between the flow field plate and the electrolyte element, and between flow field plates of the repetitious structures, first sealing layers being in contact with the flow field plate and the gasket structure, the first sealing layers being overlaid over a selected area of the flow field plate and over a selected area of the gasket structure, the selected areas being selected on the basis of corrosion minimization criteria and on the basis of sealing function criteria.

A focus of exemplary embodiments is also a sealing method for solid oxide cell stacks, each cell having a fuel side, an oxygen rich side, and an electrolyte element between the fuel side and the oxygen rich side, and the cells are arranged to a formation of a stack, and in the method is arranged flows in the cell by using a flow field plate, with fuel feed flow being guided to a flow distribution area. In the sealing method at least one gasket structure is between the flow field plate and the electrolyte element, and between flow field plates of repetitious structures, with first sealing layers in contact with the flow field plate and the gasket structure. In the method, the first sealing layers are overlaid over a selected area of the flow field plate and over a selected area of the gasket structure, and the selected areas are selected on the basis of corrosion minimization criteria and on the basis of sealing function criteria.

Exemplary embodiments are based on utilization of sealing layer structures in contact with a flow field plate and a gasket structure, and in contact with an electrolyte element and a gasket structure. The sealing layers are overlaid over a selected area of the flow field plate, over a selected area of the gasket structures, and optionally also over a selected area of the electrolyte element. The selected area is determined on the basis of structures of the contacting materials, and on the basis of a functional structure of a fuel cell stack or of an electrolyzer stack.

Exemplary benefits are that reliability of a cell stack can be improved, decreasing the operational cost of SOFC and SOEC systems, and lifetime of the cell stack becomes longer, thus making power operation of the entire cell system better and more economical as compared to known embodiments.

According to the present disclosure, a fuel cell or electrolyzer stack can include at least two single repetitious structures. A single repetitious structure includes at least one electrochemically active electrolyte element structure including fuel side, electrolyte in between, and oxygen rich side, placed between at least two flow field plates the one distributing oxygen rich gas in the oxygen rich side of the electrolyte element structure and the other distributing fuel gas in the fuel side of the electrolyte element, and at least one sealing means sealing the gas atmosphere at its intended enclosure. The flow field plate has at least one inlet opening for fuel gas and/or oxygen rich gas and at least one outlet opening for used fuel gas and/or oxygen rich gas. The flow directions of the fuel gas and oxygen rich gas can be arranged in co-flow arrangement in which both gases are flowing essentially to the same direction on each side of the electrolyte element, or in counter-flow arrangement in which the flow direction is essentially the opposite between the fuel and oxygen rich gases, or in gross-flow arrangement in which the flow direction is essentially in a 90° angle between the fuel and oxygen rich gas, or in their combinations.

In the following, exemplary embodiments are mainly explained in relation to a solid oxide fuel cell technology. The solid oxide electrolyzer stack only differs from solid oxide fuel cell stack in that manner that electricity is used to produce chemicals with reverse reactions to fuel cell reactions as is known.

Figure 2:
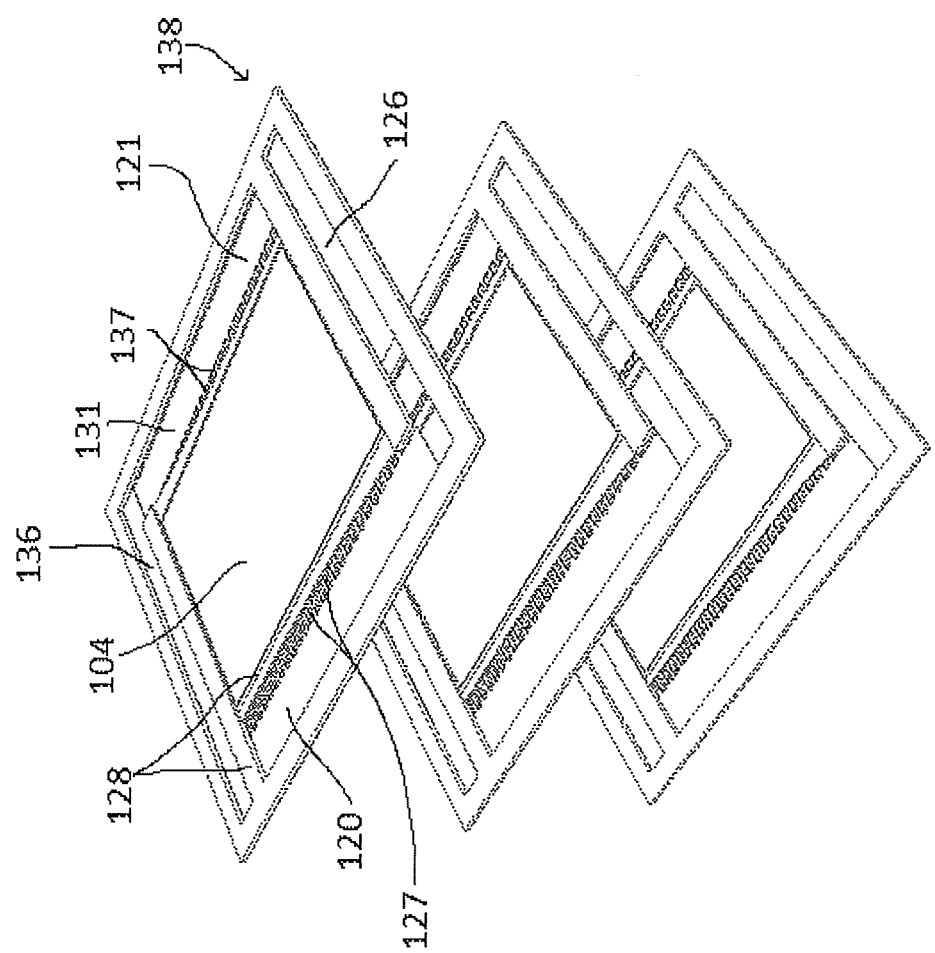
FIG. 2 presents a repetitious sold oxide cell structure.

FIG. 2 presents exemplary repetitious solid oxide cell structure. The solid oxide cell stack includes several plates 121 placed in repetitious structure 138 in a shown manner. The plates in this embodiment are rectangular and symmetrical. An electrolyte element structure 104 can include an electrolyte layer between an anode electrode and a cathode electrode is placed between the plates 121 generally in the middle of the plate. The electrolyte element structure 104 may be any suitable electrolyte element structure and is not therefore described herein in any further detail. The flow field plates 121 and the electrolyte element structure 104 are sealed with a gasket structure 128, which is for example made of compressible material, which is for example silicate mineral, glass, metal, glass-ceramic, ceramic or their compound material. The gasket structures 128 according to an exemplary embodiment, are compressed when the cells are assembled to a stack formation. Two opposing flow field plates 121 and the electrolyte element structure 104 and the gasket structure 128 therebetween form a single repetitious structure.

In one embodiment (e.g. FIG. 2) heights of the flow orifices 127, 137 can be determined by a distance from at least one of a bottom of the flow distribution area 120 and of the flow outlet area 131 to a bottom of the gasket structure 128 to stabilize flow distribution in the repetitious structures 138 of the stack, which has tolerance variations in electrolyte element 104 structure thickness. Similar pressure loss conditions between the cells are accomplished by utilizing the gasket structure 128 which can be compressed and also pre-compressed at least from the flow parts 150 in order to accomplish even thermal distribution, i.e., similar thermal gradients between the cells in the stack. Thus the duty ratio of the solid oxide cell stack is improved, and also lifetime of the stack is made longer.

A cell stack arrangement according to the present disclosure can include flow restriction orifices opened to a flow distribution area and to the flow outlet area. In one embodiment, means can be used for guiding fuel feed flow to the flow distribution area from sides of the fuel cell. A gasket structure is compressed over the flow restriction orifices. The flow restriction orifices ensure homogenous fuel flow distribution to the entire active area of the fuel cell electrode by creating an additional pressure sink to the flow path. The gasket structure also creates similar pressure loss conditions between repetitious structures of the fuel cell ensuring homogenous flow distribution characteristics for each repetitious structure of a fuel cell. The even flow distribution in the fuel cell stack ensures also even thermal distribution conditions for the fuel cell stack, i.e. similar thermal gradients between the cells in the stack. Thus the duty ratio of the fuel cell stack can be improved, and lifetime of the fuel cell stack is made longer.

A purpose of the gasket structure can be to ensure that oxidant and fuel are not directly mixed without the fuel cell reactions inside the electrochemically active area, that the fuel and oxidant are not leaked out from the electrochemical cells, that the adjacent electrochemical cells are not in electronic contact with each other, and that oxidant and fuel are supplied to the desired flow field plate planes. A flow field plate can be a planar thin plate that is made of metal alloy, ceramic material, cermet material or other material that can withstand chemical, thermal and mechanical stresses that are present in a fuel cell. The oxygen rich gas can be any gas or gas mixture, which includes a measurable amount of oxygen.

Exemplary manufacturing methods for forming the contoured surface of the flow field plates are methods using plastic deformation such as stamping, pressing and like, wherein the shape of the material is changed but no material is added or removed, or methods wherein material is added such as welding or removed such as etching. Other manufacturing methods can be utilized if the flow field material is brittle such as extrusion, casting, printing, molding, and like. The orifices for gases can be made in a same manufacturing step.

Each flow field plate can be made similar in the stack assembly structure, thus only one type of plate is needed to produce a fuel cell stack having desired amount of repetitious electrolyte element structures. This simplifies the structure and eases manufacturing of the fuel cells.

The single largest energy consumption device in a fuel cell system is the air blower or compressor that is used to supply air to the cathode compartment of fuel cell stack. The power consumption of the air supply devices is proportional to the pressure level they have to compress the air. Also in solid oxide electrolyzer systems, air can be supplied to the anode in order to control the heat balance of the electrolyzer stack and to sustain well defined oxygen partial pressure on the anode compartment. One of the main pressure loss sources in the fuel cell and electrolyzer system is the stack itself. It can be advantageous to design the device in such a manner that the air side of the device has open channels to the surrounding atmospheres. In this configuration, the air supply and exhaust chambers can be designed Individually from the stack device in such a manner that the pressure losses are minimized. Such a design also allows cost reductions to the system as the stack footprint can be reduced compared to a solution in which air is manifolded internally in the stack as material is saved. Furthermore, in one embodiment the placement of the fuel distribution channels in sides of the fuel cell are for example placed 90° in respect to the air inlet and outlet sides in order to ensure even air flow distribution to the fuel cell stack as the fuel distribution channels are then not restricting the air flow to the stack. In exemplary embodiments according to the present disclosure fuel distribution channels can also locate differently as presented above.

Figure 3:
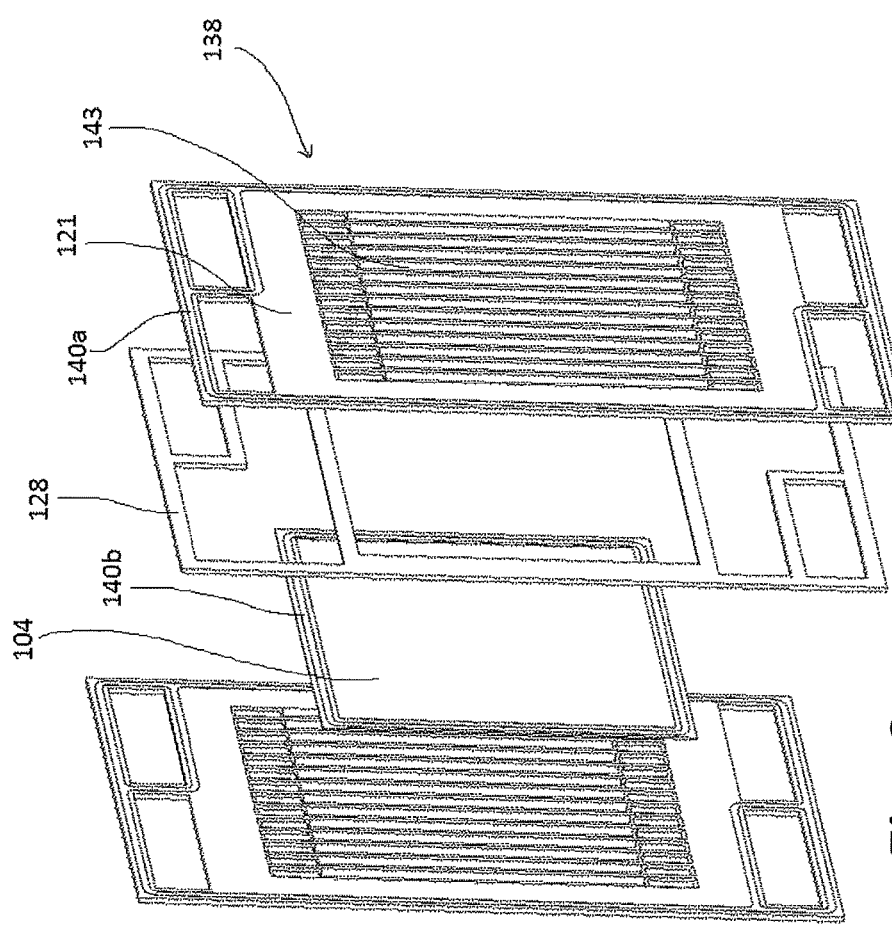
FIG. 3 presents an exemplary cell structure according to the present disclosure.
Figure 4:
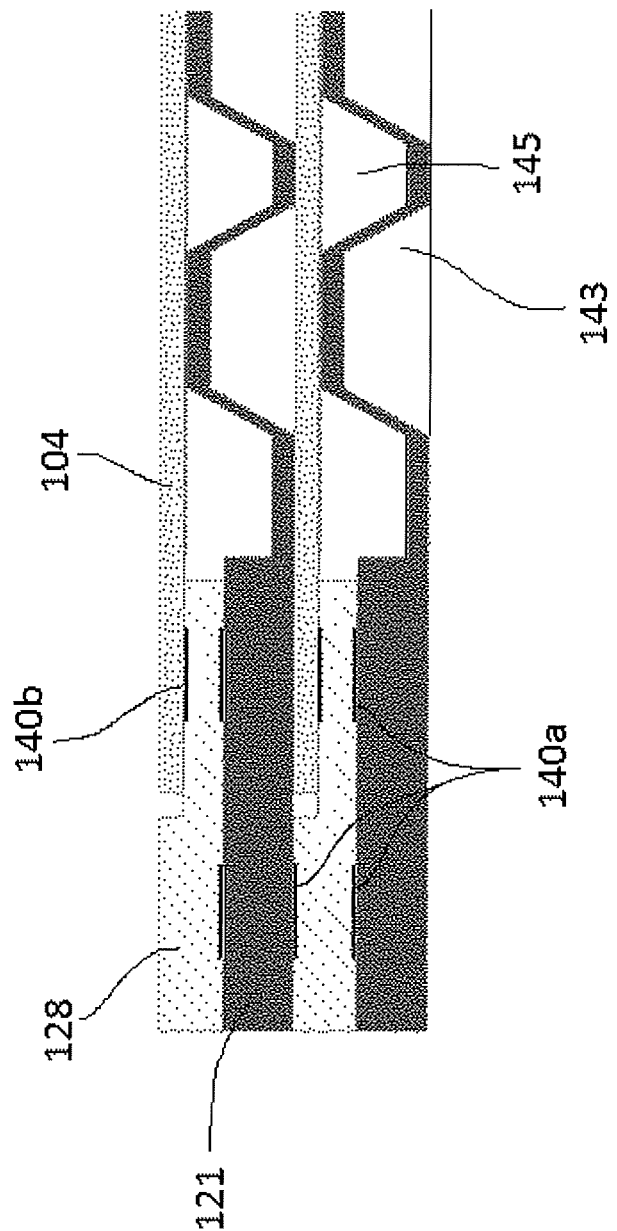
FIG. 4 presents a sectional view of an exemplary sealing arrangement according to the present disclosure.

FIG. 3 presents an exemplary sealing arrangement structure according to the present disclosure, and in FIG. 4 presents a sectional view of the exemplary sealing arrangement according to the present disclosure.

Each solid oxide cell includes a fuel side 100, an oxygen rich side 102, and an electrolyte element 104 between the fuel side and the oxygen rich side. The solid oxide cells are fuel cells or electrolyzer cells. The cells are arranged to a formation of a stack, which stack includes in repetitious structures 138 a flow field plate 121 for each cell to arrange gas flows in the cell, a gas flow distribution area 120 on the flow field plate 121, and a gas flow outlet area 131 on the flow field plate 121. The solid oxide cell stack can also include a flow area 143 on the fuel side of the flow field plate 121 and flow area 145 on the oxygen rich side of the flow field plate 121, and flow orifices 126, 136 opened to the flow distribution area 120 and to the flow outlet area 131. The sealing arrangement can include at least one gasket structure 128 between the flow field plate 121 and the electrolyte element 104, and between flow field plates 121 of the repetitious structures 138. The sealing arrangement further can include first sealing layers 140a in contact with the flow field plate 121 and the gasket structure 128. The first sealing layers are overlaid over a selected area of the flow field plate 121 and over a selected area of the gasket structure 128. An exemplary sealing arrangement also can include second sealing layers 140b in contact with the electrolyte element 104 and the gasket structure 128. The second sealing layers 140a are overlaid over a selected area of the electrolyte element 104 and over a selected area of the gasket structure 128. The selected areas are selected on the basis of corrosion minimization criteria and on the basis of sealing function criteria. The sealing layers 140a, 140b are for example, manufactured by screen printing technology, and being at least partly of glass material, of glass-ceramic material, or of brazing alloy material.

The gasket structure 128 is for example, made of compressible material, which is for example, silicate mineral, glass, metal glass-ceramic, ceramic or their compound material. The gasket structures 128 according to the present disclosure can be compressed between two compressive strength surfaces when the cells are assembled to a stack formation. The compressive surfaces are surfaces of the flow field plates 121, or surface of the electrolyte element 104 and surface of the flow field plate 121. The gasket structure 128 is for example pre-compressed at least from the flow parts 150, where the gasket structure does not have the overlaid sealing layers. The gasket structure 128 is at least partly made of compressible material for encapsulating the sealing layers 140a and/or 140b and for sealing boundaries in order to prevent convective gas flows to the sealing layers 140a and/or 140b. The boundaries are boundaries between the gasket structure 128 and the flow field plates 121 and/or boundaries between the gasket structure 128 and the electrolyte element 104. The gas flows are for example, especially oxygen containing gases, which together with high temperature conditions would cause corrosion to contact surfaces of flow field plate 121 metal and gasket structure 128 material and to contact surfaces between electrolyte element 104 material and gasket structure 128 material. The selected area, i.e. width of the sealing layer 140a, 140b is for example, essentially narrower than width of the gasket structure 128 in order to make the encapsulation and oxygen isolation successful. In an exemplary sealing arrangement the gasket structure 128 includes insulation material for isolating electricity between the flow field plates 121 and/or between the flow field plates 121 and the electrolyte elements 104.

Figure 5:
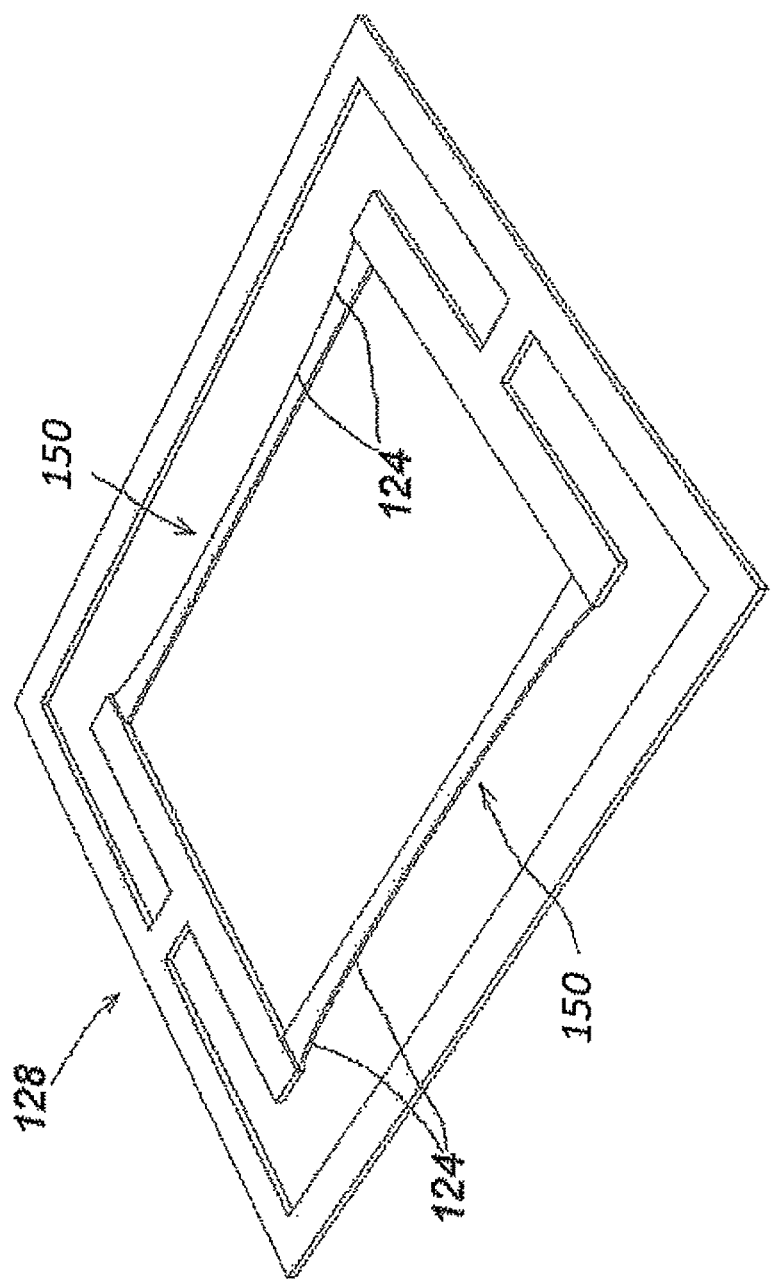
FIG. 5 presents an exemplary gasket structure.

FIG. 5 presents another exemplary embodiment of the gasket structure according to the present disclosure, the gasket structure having the ½ elliptic geometrical shape 124. In a cell stack arrangement using a flow guiding arrangement with the ½ elliptic geometrical shape 124 or with another shape 124 of the gasket structure 128, feed-in flows and out flows can be differently arranged than presented above related to other embodiments.

The gasket structure 128 can include the at least one geometrical shape 124 for adjusting essentially homogenous flow over the electrolyte element. The geometrical shape 124 is for example at least partly elliptic, e.g. ½ elliptic or ¼ elliptic or other geometrical shape 124 than elliptic. FIG. 5 presents one exemplary embodiment of the gasket structure according to the present disclosure, the gasket structure having the ½ elliptic geometrical shape 124 which is also shown in the exemplary embodiments of FIGS. 3 and 4. The gasket structure 128 is for example, made of compressible material, which can be pre-compressed at least from the flow parts 150. The gasket structure is made e.g., of silicate mineral, glass, metal, glass-ceramic, ceramic or their compound material. On the basis of the compression and/or pre-compression pressure loss characteristics are more controllable, and flowing conditions between different cells in the stack are achieved as substantially equal. The gasket structure on the restriction orifices area 127, 137 can be pre-compressed to a well-defined thickness in order to prevent the gasket material from spreading to the restriction orifices structure and thus in order to prevent the gasket material from changing the height characteristics of the restriction orifices.

In some embodiments an arrangement can include larger flow ducts (i.e. flow channels) arranged on the middle area of the electrolyte element and smaller flow ducts on the side areas of the electrolyte element.

Exemplary embodiments can enable the electrolyte element placement to be eased during the assembly process of the fuel cell stack or electrolysis cell stack. The gasket structure is shaped so that the electrolyte element can be placed into a hole in the gasket structure which then locks the electrolyte element to its desired position both during the assembly process as well as gives a support for the electrolyte element during the the fuel cell and electrolyzer stack operation.

It is expressly intended that all combinations of those elements which perform substantially the same results are within the scope of the invention. Substitutions of the elements from one described embodiment to another are also fully intended and contemplated.

It will also be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A sealing arrangement for a solid oxide cell stack, where each cell includes a fuel side, an oxygen rich side, and an electrolyte element having an electrolyte layer between the fuel side and the oxygen rich side, the cells being arranged to form a stack, and the solid oxide cell stack includes in repetitious structures a flow field plate for each cell to arrange flows in the cell, a flow distribution area on the flow field plate as an area to which fuel feed flow is guided, a flow outlet area on the flow field plate, a flow area on the flow field plate, and flow orifices open to the flow distribution area and to the flow outlet area, wherein the sealing arrangement comprises:
at least one gasket structure, which is located between the flow field plate and the electrolyte element, and said at least one gasket structure is located between the flow field plates of said repetitious structures;
first sealing layers, which are in contact with the flow field plate and the gasket structure, the first sealing layers covering over a selected area of the flow field plate and over a first selected area of the gasket structure; and
second sealing layers in contact with the electrolyte element and the gasket structure, the second sealing layers covering over a selected area of the electrolyte element and over a second selected area of the gasket structure, wherein the first selected area of the gasket structure is a different area than the second selected area of the gasket structure.

2. Sealing arrangement according to claim 1, wherein the sealing arrangement comprises:
the gasket structure compressed between compressive strength surfaces of at least one of the flow field plates and the electrolyte elements.

3. Sealing arrangement according to claim 1, wherein the gasket structure is at least partly made of compressible material for encapsulating the sealing layers and for sealing boundaries between the electrolyte elements and the flow field plates and between the flow field plates.

4. Sealing arrangement according to claim 1, wherein the gasket structure comprises:
insulation material for isolating electricity between the flow field plates.

5. Sealing arrangement according to claim 1, wherein the gasket structure comprises:
insulation material for isolating electricity between the flow field plates and the electrolyte elements.

6. Sealing arrangement according to claim 1, wherein the arrangement comprises:
sealing layers.

7. A sealing method for sealing solid oxide cell stacks, each cell having a fuel side, an oxygen rich side, and an electrolyte element having an electrolyte layer between the fuel side and the oxygen rich side, the cells being arranged to form a stack, which includes in repetitious structures a flow field plate for each cell to arrange flows in the cell, a flow distribution area on the flow field plate as an area to which fuel feed flow is guided, a flow outlet area on the flow field plate, a flow area on the flow field plate, and flow orifices opened to the flow distribution area and to the flow outlet area, wherein flows from the flow distribution area flow on a flow field plate, the method comprising:
locating at least one gasket structure between the flow field plate and the electrolyte element, and between flow field plates of repetitious structures;
locating first sealing layers in contact with the flow field plate and the gasket structure, the first sealing layers covering over a selected area of the flow field plate and over a first selected area of the gasket structure; and
locating second sealing layers in contact with the electrolyte element and the gasket structure, the second sealing layers covering over a selected area of the electrolyte element and over a second selected area of the gasket structure, wherein the first selected area of the gasket structure is a different area than the second selected area of the gasket structure.

8. Sealing method according to claim 7, comprising:
compressing the gasket structure between two compressive strength surfaces.

9. Sealing method according to claim 7, comprising:
encapsulating the sealing layers and sealing boundaries between the electrolyte elements and the flow field plates and between the flow field plates by compressing compressible material of the gasket structure.

10. Sealing method according to claim 7, comprising:
performing electrical isolation between the flow field plates with insulation material of the gasket structure.

11. Sealing method according to claim 7, comprising:
performing electrical isolation between the flow field plates and the electrolyte element with insulation material of the gasket structure.

12. Sealing method according to claim 7, comprising:
screen printing the sealing layers.

* * * * *